(12) United States Patent
Fukui

(10) Patent No.: US 7,487,694 B2
(45) Date of Patent: Feb. 10, 2009

(54) BICYCLE HANDLEBAR

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 236 days.

(21) Appl. No.: 11/188,779

(22) Filed: Jul. 26, 2005

(65) Prior Publication Data

US 2006/0169094 A1 Aug. 3, 2006

(30) Foreign Application Priority Data

Jan. 20, 2005 (JP) ............... 2005-012851

(51) Int. Cl.
*F16C 1/10* (2006.01)
(52) U.S. Cl. ............... 74/502.2; 74/484 R; 74/501.6; 74/551.1
(58) Field of Classification Search ............... 74/484 R, 74/500.5, 501.5 R, 501.6, 502.2, 502.4, 551.1, 74/551.9, 551.2–551; 188/24.22, 24.15, 188/24.18
See application file for complete search history.

(56) References Cited

U.S. PATENT DOCUMENTS

| | | | | |
|---|---|---|---|---|
| 4,245,522 A * | 1/1981 | Robinson | ........... | 74/480 R |
| 4,762,018 A * | 8/1988 | Yoshigai | ........... | 74/523 |
| 4,909,094 A * | 3/1990 | Yoshigai | ........... | 74/489 |
| 5,370,017 A * | 12/1994 | Krauer | ........... | 74/502.2 |
| 5,799,544 A * | 9/1998 | Oda | ........... | 74/502.4 |
| 6,039,499 A * | 3/2000 | Chiang | ........... | 403/78 |
| 6,164,153 A * | 12/2000 | Scura | ........... | 74/502.4 |
| 6,431,326 B1 * | 8/2002 | Takizawa | ........... | 188/24.11 |
| 6,443,027 B1 * | 9/2002 | Cheever et al. | ........... | 74/502.2 |
| 6,668,681 B2 * | 12/2003 | Flum et al. | ........... | 74/551.1 |
| 6,983,949 B2 * | 1/2006 | Ueno et al. | ........... | 280/279 |
| 7,240,772 B2 * | 7/2007 | Tsai | ........... | 188/24.22 |
| 2003/0183036 A1 * | 10/2003 | Chou | ........... | 74/501.5 R |

FOREIGN PATENT DOCUMENTS

| | | | |
|---|---|---|---|
| CN | 87205545 | U | 10/1988 |
| FR | 663 073 | A | 8/1929 |
| GB | 21 969 | A | 7/1912 |
| GB | 338 061 | A | 11/1930 |
| JP | S56-19485 | U1 | 7/1979 |
| JP | S56-143988 | U1 | 3/1980 |
| JP | S56-161879 | U1 | 5/1980 |
| JP | S57-12394 | U1 | 6/1980 |
| JP | 56-57583 | A | 5/1981 |
| JP | 57-12393 | U | 1/1982 |

(Continued)

*Primary Examiner*—Richard W Ridley
*Assistant Examiner*—Matthew Johnson
(74) *Attorney, Agent, or Firm*—Global IP Counselors, LLP

(57) ABSTRACT

A handlebar is disclosed that includes a handlebar main body, a pair of support walls, a first slit, and a brake lever. The handlebar main body is hollow and is mounted to the handlebar stem. The hollow interior of the handlebar main body is formed with the support walls that extend along at least a portion of the length of the interior of the handlebar main body. The brake lever has a lever body and a brake cable attachment portion. The lever body is pivotally supported by the support walls proximate the first slit. The lever body includes a brake operating portion that extends away from the handlebar main body and a pivot support portion that is pivotally mounted to the support walls.

11 Claims, 8 Drawing Sheets

FOREIGN PATENT DOCUMENTS

| | | |
|---|---|---|
| JP | 57-27187 U | 2/1982 |
| JP | 58-50094 U | 4/1983 |
| JP | 59-128483 U | 8/1984 |
| JP | 63-195990 U | 12/1988 |
| JP | H01-80590 U1 | 5/1989 |
| JP | 05-16863 A | 1/1993 |
| JP | 06-8182 U | 2/1994 |
| JP | H07-33063 A | 2/1995 |
| JP | 09-164987 A | 6/1997 |
| JP | H09-267731 A | 10/1997 |
| JP | 10-129293 A | 5/1998 |
| JP | 2000-142532 A | 5/2000 |

* cited by examiner

BICYCLE HANDLEBAR

CROSS-REFERENCE TO RELATED APPLICATIONS

This application claims priority to Japanese Patent Application No. 2005-012851filed Jan. 20, 2005. The entire disclosure of Japanese Patent Application No. 2005-012851 is hereby incorporated herein by reference.

BACKGROUND OF THE INVENTION

1. Field of the Invention

The present invention relates to a handlebar, and more particularly to a bicycle handlebar that is mounted on the handlebar stem of a bicycle and is formed with a brake lever supporting structure.

2. Background Information

A central portion of a bicycle handlebar is typically fixed to a handlebar stem that is further connected to a front fork of a bicycle, as shown in, for instance, Japanese Laid-Open Patent Application H5-16863. At least one brake lever assembly is typically mounted to one end of the handlebar. The brake lever assembly includes a bracket removably mounted to the handlebar, and a lever member is pivotally mounted to the bracket. A lever shaft for pivotally supporting the lever member is mounted to the bracket, and the bracket is also provided with a cable casing adjusting member for receiving the outer casing of a Bowden type brake cable. The lever member is provided with an inner cable connector for attachment to a cable of a Bowden type brake cable. The lever member includes a contoured portion that is shaped to be engaged by a cyclist's hand for engagement of the brakes operated by the brake lever assembly. The contoured portion is provided on a distal end part of the lever member.

With the above-mentioned conventional handlebar and brake lever assembly, since the lever member is pivotally supported on the lever shaft on the bracket mounted to the handlebar, the lever member is spaced apart from the handlebar. Accordingly, a person with small hands may have difficulty reaching the contoured portion of the lever member of the brake lever assembly since the contoured portion is located at the distal end of the lever member. Also, since the bracket is removably attached to the handlebar, the brake lever assembly has numerous parts that in some designs has an unsightly look and lacks an elegant appearance. In general, such a brake lever assembly designs make it difficult to achieve a simple and elegant look for a bicycle handlebar.

In view of the above, it will be apparent to those skilled in the art from this disclosure that there exists a need for an improved handlebar and brake lever assembly that has a more appealing appearance and is easier for a small hand to operate. This invention addresses this need in the art as well as other needs, which will become apparent to those skilled in the art from this disclosure.

SUMMARY OF THE INVENTION

One object of the present invention is to provide the handlebar and brake lever assembly with a more elegant appearance.

Another object of the present invention is to provide a simple brake lever assembly construction.

Another object of the present invention is to provide a brake lever assembly that is integrated with the handlebar.

Another object of the present invention is to provide a brake lever assembly and handlebar with a shorter distance therebetween making operation by a cyclist with small hands easier.

The foregoing objects can basically be attained by providing a bicycle handlebar mounted on a handlebar stem of a bicycle with an internal structure for supporting a brake lever. The handlebar includes a handlebar main body formed a pair of support walls, a first slit, and fitted with a brake lever. The handlebar main body is hollow and is mounted on the handlebar stem. The support walls are disposed spaced apart from one another and extend at least part of the lengthwise of a hollow interior of the handlebar main body. The first slit extends between the hollow interior and the exterior of the handlebar main body proximate a location corresponding to the support walls in at least a portion of the handlebar main body. The brake lever has a lever body and a brake cable attachment portion. The lever body has a pivot support portion and a brake operating portion. The pivot support portion is pivotally mounted to the handlebar main body between the support walls proximate the first slit. The brake operating portion extends through the first slit and away from the handlebar main body. The brake cable attachment portion is located on the lever body between the brake operating portion and the pivot support portion.

With the handlebar design of the present invention, the pivot support portion of the lever body pivots about a pin that extends between the support walls. The lever body extends so that it is exposed on the outside of the handlebar main body through the first slit, and is provided at the distal end with the brake operating portion, and the brake cable is latched to the brake cable attachment portion located on the lever body between the pivot support portion and the brake operating portion. Here, since the support walls are provided integrally in the handlebar main body, a bracket that would otherwise pivotally support the brake lever is unnecessary, providing the handlebar and brake lever with a simpler and uncluttered appearance. Also, since the pivot support portion is provided within the interior of the handlebar main body, the brake operating portion of the brake lever can be moved closer to the handlebar main body, so the resulting brake lever can be easily operated even by people with small hands.

In another aspect of the present invention, the brake cable attachment portion of the brake lever receives a Bowden type cable having an inner cable surrounded by an outer casing. The bicycle handlebar includes a cable casing connector that receives and supports the outer casing and the brake cable attachment portion includes an inner cable connector that engages and secures the inner cable. As a result, the handlebar and brake lever are provided with a simpler look when a Bowden type brake cable is employed.

In accordance with another aspect of the invention, the bicycle handlebar further includes a second slit that opens between the support walls closer to the handlebar stem mounting side than the first slit, wherein the brake cable latched to the brake cable attachment portion is inserted into the second slit. In this case, since the brake cable is housed inside the support walls through the second slit, less of the brake cable is exposed on the outside, affording a simpler look around the brake lever.

In accordance with another aspect of the invention, the bicycle handlebar further includes a brake cable housing that is formed integrally with the outer peripheral part of the handlebar main body. Such a bicycle handlebar is capable of housing the brake cable connected to the brake cable attachment portion. In this case, since the brake cable is housed inside the brake cable housing, even less of the brake cable is exposed on the outside, affording an even simpler look in the area around the brake lever.

In accordance with another aspect of the invention, the brake operating portion has a first portion on the proximal end side closer to the pivot support portion, and a second portion on the distal end side farther away from the pivot support portion than the first portion. When the brake lever is pivoted toward the handlebar main body, the second portion is positioned closer to the handlebar main body than the first portion. In this case, since the first portion on the proximal end side of the brake lever is disposed farther away from the handlebar main body than the second portion on the distal end side, when the second portion is operated with the middle or ring finger, the index finger disposed on the handlebar main body will not hit the first portion on the proximal end side, allowing the brake operating portion to be moved closer to the handlebar main body.

In accordance with another aspect of the invention, the bicycle handlebar is arranged and configured to be mounted on a handlebar stem of a bicycle and includes a hollow handlebar main body, a pair of support walls, a first slit, and a lever shaft support portion. The handlebar main body is hollow and is arranged and configured to be mounted on the handlebar stem. Within the hollow interior of the handlebar main body, the support walls extend in the lengthwise direction of the handlebar, and are disposed to define a space therebetween. The first slit opens between the support walls in at least a portion of the handlebar main body. The lever shaft support portion has an insertion hole that is arranged and configured for receiving a lever shaft for pivotally supporting the brake lever.

With this handlebar, the lever shaft support portion having the lever shaft insertion hole in which the lever shaft is inserted is provided to the portion where the first slit is formed in the support walls disposed in the interior of the handlebar main body, and the brake lever can be pivotally supported by the lever shaft. The lever body extends through the first slit so as to be exposed on the outside of the handlebar main body, and the brake operating portion is provided to the distal end part, and the brake cable is latched between the pivot support portion and the brake operating portion. Here, since the support walls are provided to the handlebar main body, the lever shaft support portion is provided thereto, the bracket that would otherwise be used is replaced, and the brake lever can be pivotally supported, the bracket is unnecessary, affording a brake lever with a simpler look. Also, since the lever shaft support portion is provided in the interior of the handlebar main body, when the lever shaft is mounted to the lever shaft support portion and the brake lever is pivotally supported, the brake operating portion of the handlebar can be moved closer to the handlebar, so the resulting brake lever can be easily operated even by people with small hands.

In accordance with yet another aspect of the invention, the bicycle handlebar further includes a second slit that opens between the pair of support walls closer to the handlebar stem mounting side than the first slit. In this case, since the brake cable is housed within the support walls through the second slit, less of the brake cable is exposed on the outside, affording a simpler look around the brake lever.

According to the present invention, since a pair of support wall are provided within a handlebar main body, replacing the bracket that would otherwise be used for the brake lever, and pivotally support the brake lever, the bracket is unnecessary. This arrangement affords a brake lever with a simpler look. Also, since the pivot support portion is provided in the interior of the handlebar main body, the brake operating portion of the handlebar can be moved closer to the handlebar, so the resulting brake lever can be easily operated even by people with small hands.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
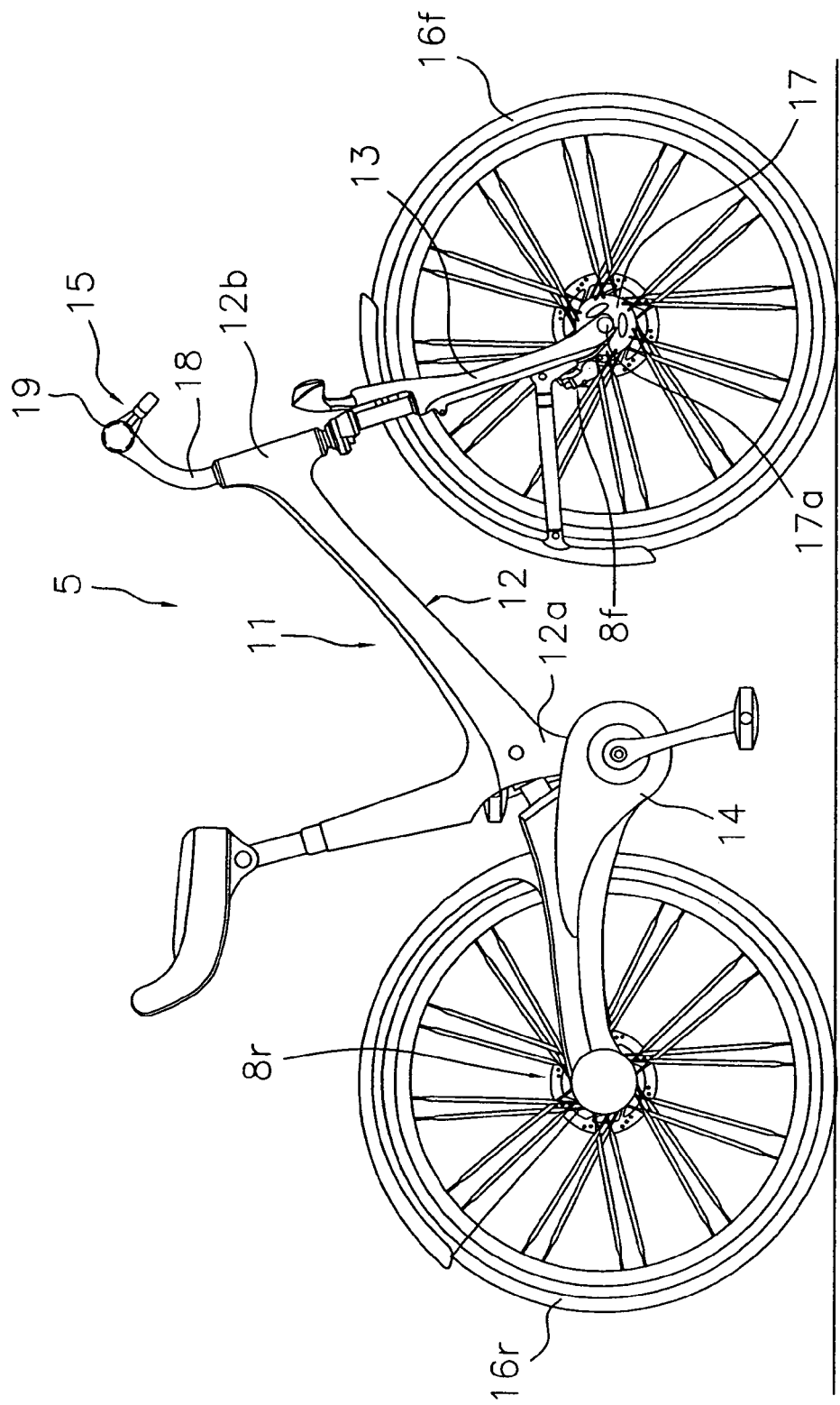
FIG. 1 is a side elevational view of a bicycle having a handlebar in accordance with a first embodiment of the present invention.

Referring initially to FIG. 1, a bicycle 5 is illustrated in accordance with a first embodiment of the present invention.

In FIG. 1, the bicycle 5 includes a frame 11, which includes a frame body 12 and a suspension fork 13. The frame body 12 has a contoured shape that curves to form a V-shape and includes a hanger component 12a and a head tube 12b. The suspension fork 13 is mounted rotatably around an inclined vertical axis to the head tube 12b of the frame body 11. The head tube 12b is provided at the front part of the frame body 12 and the hanger component 12a is located in a mid portion of the bicycle 5.

The bicycle 5 also has a drive unit 14, a front wheel 16f, a rear wheel 16r and a handlebar assembly 15. The drive unit 14 is pivotally mounted to the lower part of the frame body 12. The front wheel 16f is mounted to the distal end of the suspension fork 13. The rear wheel 16r is mounted to the rear end of the drive unit 14. The handlebar assembly 15 is supported on an upper portion of the suspension fork 13. The bicycle 5 also has front and rear disc brake units 8f and 8r. A generator hub 17 is mounted in the center of the front wheel 16f, and a hub axle 17a thereof is removably fixed to the lower end of the suspension fork 13.

The hanger component 12a of the frame body 12 protrudes downward from the curved portion, and the drive unit 14 is mounted to the hanger component 12a. The drive unit 14 is pivotally mounted to the hanger component 12a and has a conventional suspension function.

The handlebar assembly 15 includes a handlebar stem 18 and a handlebar 19. The handlebar stem 18 is non-rotatably mounted to the suspension fork 13 and the handlebar 19 is fixedly mounted to the handlebar stem 18 in accordance with one embodiment of the present invention.

Figure 2:
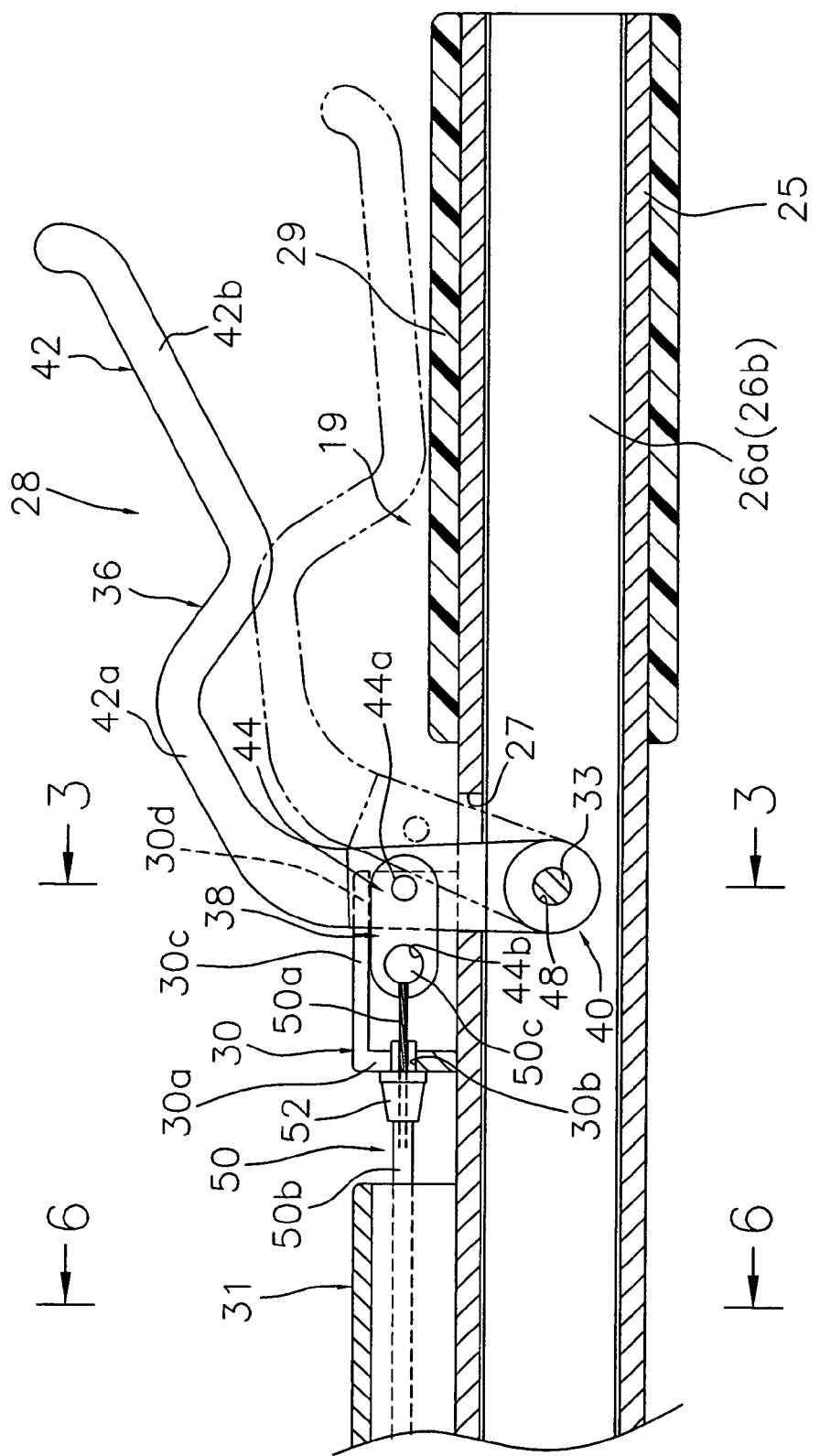
FIG. 2 is a partial cross sectional view of the handlebar in accordance with the first embodiment of the present invention.
Figure 3:
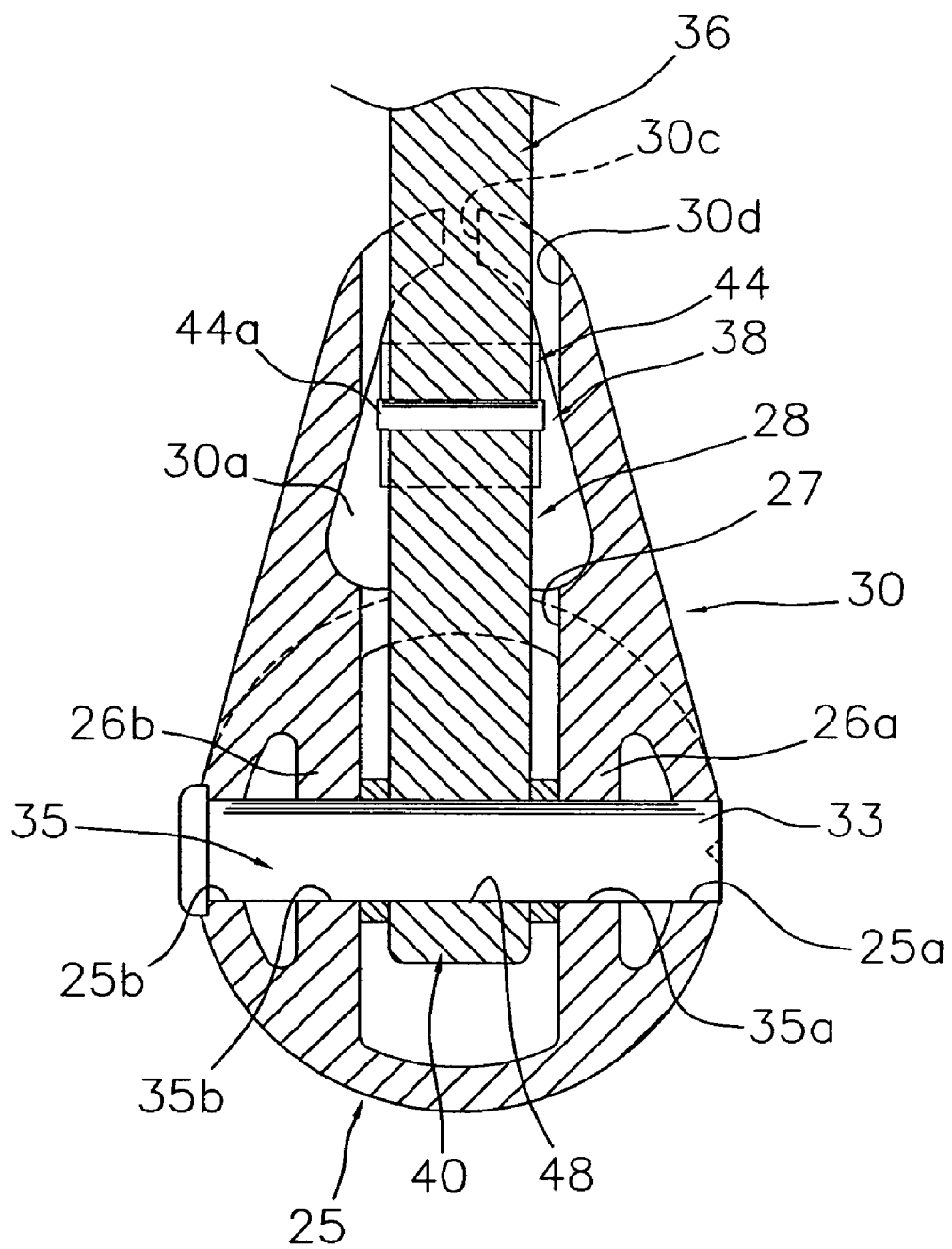
FIG. 3 is a cross sectional view of the handlebar taken along the line 3-3 in FIG. 2 in accordance with the first embodiment of the present invention.

As shown in FIGS. 2 and 3, the handlebar 19 has a handlebar main body 25, a pair of support walls 26a and 26b, a first slit 27, a brake lever 28 and a grip 29. The handlebar main body 25 is in the form of a flat bar that is mounted to the handlebar stem 18. The support walls 26a and 26b are formed in an interior of the handlebar main body 25 (see FIG. 3). The first slit 27 is provided in the handlebar main body 25 between the support walls 26a and 26b. The brake lever 28 is in the form of a flat lever pivotally mounted to the handlebar main body 25. The grip 29 is a conventional material that surrounds a portion of the handlebar main body 25 for gripping by a cyclist. Only the right side end of the handlebar 19 is shown in FIG. 2. Since the left end is preferably a mirror image of the right side, description of the left side is omitted for brevity since the description of the right side applies to the left side.

The handlebar 19 is also provided with a cable casing connector 30 and a brake cable housing 31. The cable casing connector 30 is attached to or formed on an exterior surface of the handlebar main body 25 for receiving an outer casing 50b of a Bowden type of brake cable 50. The brake cable housing 31 is also attached to or formed on the exterior surface of the handlebar main body 25 for housing the brake cable 50. Although only one is shown, there are two grips 29, one mounted to each respective end of the handlebar main body 25.

As shown in FIGS. 2 to 5 and 8, the handlebar main body 25 is a hollow cylindrical member formed by the drawing of an aluminum alloy, for example, or other similarly strong, rigid material. The center portion in the lengthwise direction of the handlebar main body 25 is fixed to the handlebar stem 18 in a conventional manner.

The support walls 26a and 26b are formed at least in the portion where the brake lever 28 is mounted. In the depicted embodiment, however, the support walls 26a and 26b are formed over the entire length of the handlebar main body 25.

The brake lever 28 is pivotally supported in the interior of the handlebar main body 25, but extends to the exterior of the handlebar main body 25, as shown in FIG. 2. The first slit 27 is provided in order for a portion of the brake lever 28 to be disposed at the exterior of the handlebar main body 25. The first slit 27 is also dimensioned to restrict the pivoting position of the brake lever 28. The first slit 27 opens between the support walls 26a and 26b in at least a portion of the handlebar main body 25. More specifically, the first slit 27 is formed between the support walls 26a and 26b at positions spaced apart from the two end of the handlebar main body 25 adjacent to the grip 29.

A lever shaft 33 for pivotally supporting the brake lever 28 is mounted to the support walls 26a and 26b at a position proximate the first slit 27. The lever shaft 33 is inserted into, and supported at, lever shaft insertion holes 25a and 25b formed in the handlebar main body 25 and lever shaft insertion holes 35a and 35b formed in the support walls 26a and 26b. These lever shaft insertion holes 25a and 25b and lever shaft insertion holes 35a and 35b constitute a lever shaft support portion 35. The lever shaft 33 can be supported either by the lever shaft insertion holes 35a and 35b and/or by the lever shaft insertion holes 25a and 25b. In this embodiment, the lever shaft 33 is a flanged shaft member, and is fixed to the handlebar main body 25 by crimping, for example.

With the above construction, the lever shaft 33, which is the pivot shaft of the brake lever 28, is located in the interior of the handlebar main body 25, and there is no need for a separate bracket on an exterior of the handlebar 19 for mounting the lever shaft 33.

The brake lever 28 is linked to either of the front and rear disk brake units 8f and 8r via the Bowden brake cable 50. The brake lever 28 has a lever body 36 and an inner cable connector 38. The lever body 36 is pivotally mounted to the handlebar main body 25. The inner cable connector 38 is pivotally attached to the lever body 36 and is connects to an inner cable 50a of the Bowden brake cable 50.

The lever body 36 has a pivot support portion 40 and a brake operating portion 42. The pivot support portion 40 on the proximal end side is pivotally mounted to the support walls 26a and 26b proximate the first slit 27. A distal end of the brake operating portion 42 is contoured for engagement by a cyclist's hand for operating the brakes. The lever body 36 is formed three portions, each bent or angularly offset from one another. Specifically the lever body 36 is bent from the pivot support portion 40 on the proximal end side to the brake operating portion 42 on the distal end side.

The pivot support portion 40 receives the lever shaft 33 that is inserted into the lever shaft insertion holes 35a and 35b, and a pivot support hole 48 that is provided at the proximal end of the lever body 36 and pivotally supports the lever shaft 33. The lever shaft 33 is crimped to the handlebar main body 25 as mentioned above, for example. When the brake lever 28 is in a brake release position, the brake operating portion 42 is spaced apart from the handlebar main body 25, extending outward from the pivot support portion 40 through the first slit 27, as shown in solid lines in FIG. 2. The brake operating portion 42 has a first portion 42a on the proximal end side near the pivot support portion 40, and a second portion 42b on the distal end side farther away from the pivot support portion 40 than the first portion 42a. As shown by the two-dot chain line in FIG. 2, the brake operating portion 42 is formed in a bent shape so that when the brake lever 28 pivots toward the handlebar main body 25, the second portion 42b moves closer to the handlebar main body 25 than the first portion 42a.

The shape of the brake operating portion 42 provides useful advantage to the design of the present invention. Specifically, since the first portion 42a on the proximal end side of the lever body 36 is disposed farther away from the handlebar main body 25 than the second portion 42b, when the second portion 42b is operated with a middle or ring finger, the first portion 42a remains spaced apart from the handlebar main body 25. As a result, the index finger of the cyclist is not pinched or caught between the first portion 42a and the handlebar main body 25. Thus, the brake operating portion 42 can be sufficiently moved closer to the handlebar main body 25.

The inner cable connector 38 is disposed on the lever body 36 in between the brake operating portion 42 and the pivot support portion 40 on the outside of the handlebar main body 25. The inner cable connector 38 has an oval inner latching link 44 pivotally mounted to the lever body 36. The inner latching link 44 has a pivot linking component 44a linked to both sides of the lever body 36, and a nipple latching component 44b including a circular hole that receives a cylindrical cable nipple 50c that is fixed to the distal end of the inner cable 50a. The inner cable connector 38 is normally covered or at least partially hidden by the cable casing connector 30.

The cable casing connector 30 is integrally formed on the outer face of the handlebar main body 25 at a location that preferably at least partially covers the first slit 27. As shown in FIGS. 2 to 5, the cable casing connector 30 has a peaked cross section which is rounded off at the top leading down to the handlebar main body 25, and is hollow on the inside. The end face of the outer casing 50b butts up against the proximal end of the cable casing connector 30, and a mounting wall 30a is formed for mounting a cable adjuster 52 that is used to adjust the tension on the inner cable 50a. In the mounting wall 30a a threaded hole 30b is formed into which the cable adjuster 52 is threaded. A cable slit 30c through which the inner cable 50a can be inserted or removed is formed along the entire length of the cable casing connector 30 (see FIGS. 2 and 5) extending down to the threaded hole 30b. A lever slit 30d through which the lever body 36 can move is formed on the distal end side of the cable slit 30c, opening into the distal end part.

Figure 6:
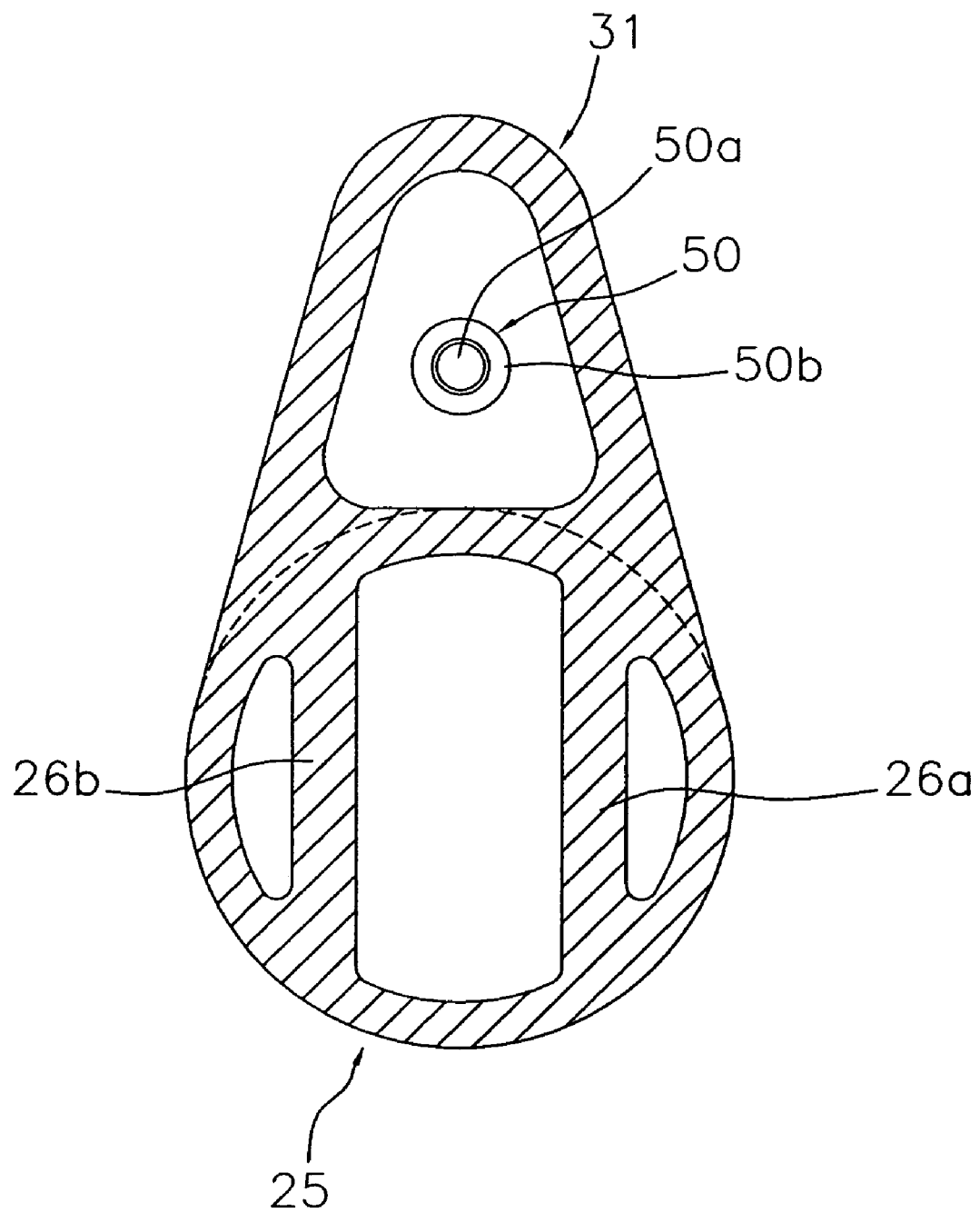
FIG. 6 is a cross sectional view of the handlebar taken along the line 6-6 in FIG. 2 in accordance with the first embodiment of the present invention.

As shown in FIGS. 2 and 6, the brake cable housing 31 has a peaked cross section similar to the cable casing connector 30. The peaked cross section of the brake cable housing 31 is rounded off at the top and is hollow on the inside. The shape of brake cable housing 31 is substantially the same as the cable casing connector 30 except that the mounting wall 30a, the cable slit 30c, and the lever slit 30d are not formed in the brake cable housing 31. The hollow portion of the brake cable housing 31 houses the brake cable 50. The housed brake cable 50 extends through the handlebar stem 18 and is taken to an outer side of the suspension fork 13, for example.

In the assembly of the handlebar 19 as described above, the inner cable connector 38 is attached to the lever body 36. The pivot support portion 40 of the brake lever 28 is inserted into the interior through the first slit 27. Care is taken so that the inner cable connector 38 goes inside the cable casing connector 30. Then the lever shaft insertion holes 25a, 25b, 35a, and 35b of the lever shaft support portion 35 are coaxially aligned with the pivot support hole 48, and the lever shaft 33 is inserted from the lever shaft insertion hole 25b side. The distal end of the lever shaft 33 protruding from the lever shaft insertion hole 25a is then flattened with a crimping tool so as to crimp the lever shaft 33 to the handlebar main body 25. As a result, the brake lever 28 is pivotally mounted to the support walls 26a and 26b of the handlebar main body 25.

In the first embodiment of the present invention, the brake lever 28 is mounted directly on the handlebar 19. Specifically, the handlebar 19 is formed integrally with a brake lever supporting structure including the support walls 26a and 26b. Accordingly, the support walls 26a and 26b are provided in the handlebar main body 25 and replace a separate bracket that would otherwise pivotally support the brake lever 28. Such a bracket is unnecessary because of the configuration of the handlebar 19 providing the brake lever 28 with a simpler look and more elegant look. Also, since the pivot support portion 40 is provided within the interior of the handlebar main body 25, the brake operating portion 42 of the brake lever 28 are closer to the handlebar main body 25, so the resulting brake lever 28 can be more easily operated, in particular by a cyclist with small hands.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 7:
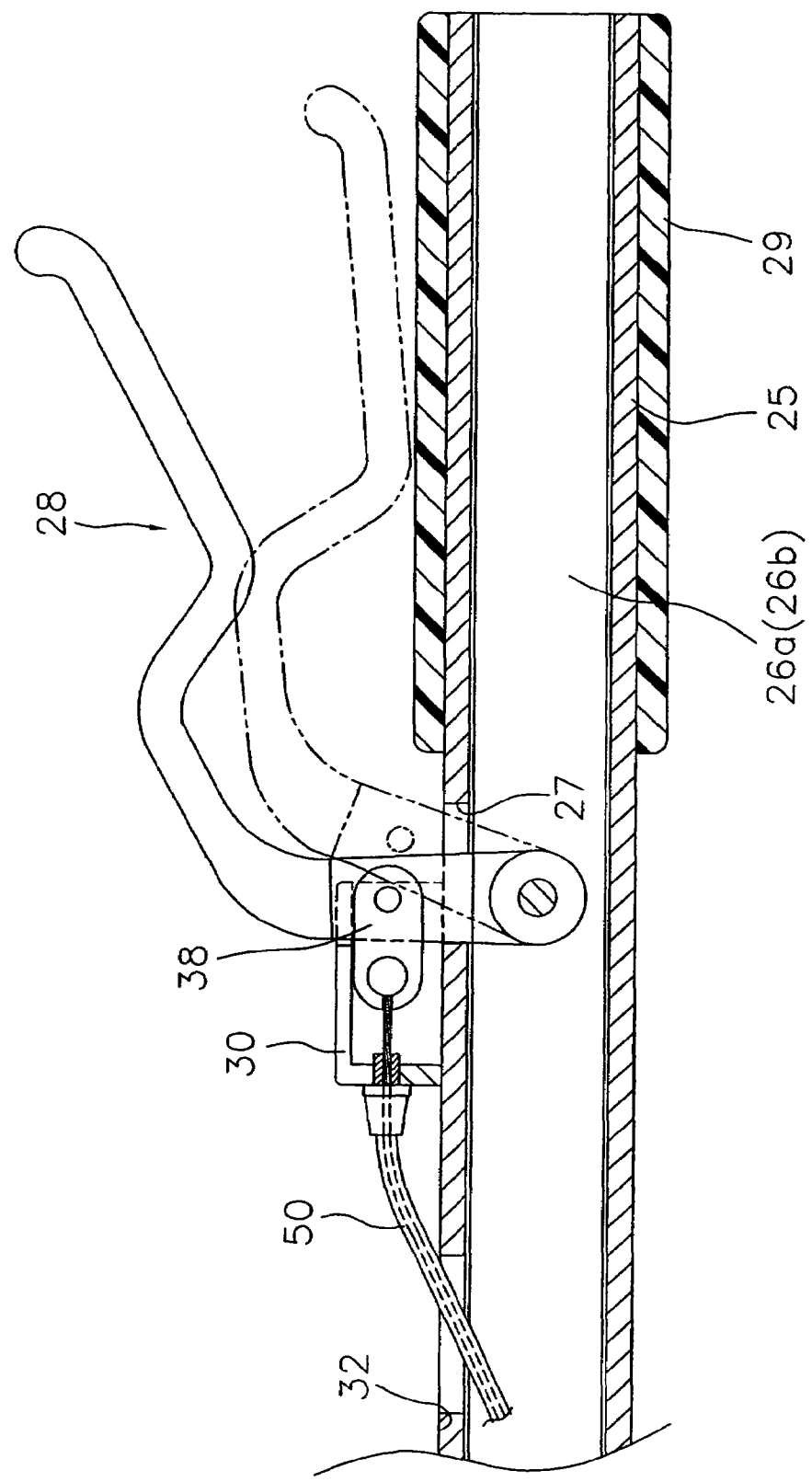
FIG. 7 is a cross sectional view of a handlebar similar to FIG. 2, in accordance with a second embodiment of the present invention.
Figure 8:
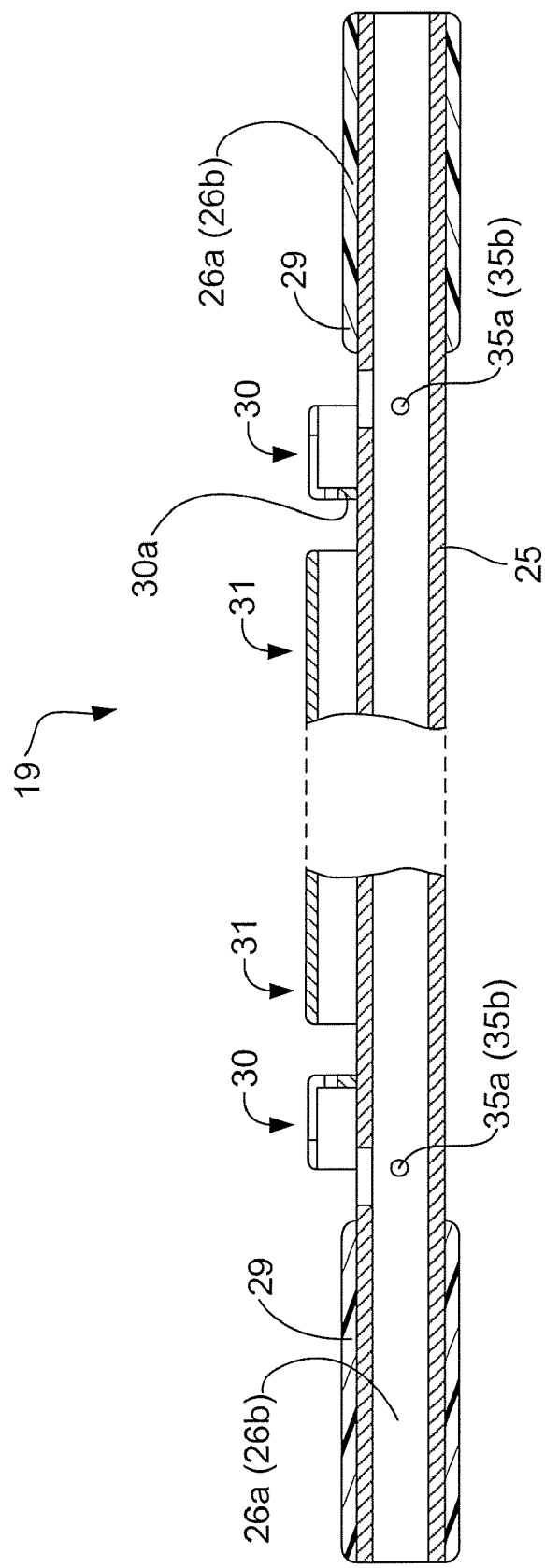
FIG. 8 is a cross sectional view of the handlebar depicted in FIGS. 2, 3, 4 and 5, in accordance with the first embodiment of the present invention.

Referring now to FIG. 7, a handlebar 25' depicted in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the above described first embodiment, the brake cable housing 31 is provided to hide the brake cable 50. In the second embodiment, as shown in FIG. 7, the brake cable housing 31 is omitted. Instead, the brake cable 50 is inserted into the interior of the handlebar 25' via a second slit 32 that is formed in the handlebar 25'. The brake cable 50 extends from the cable casing connector 30 into the second slit 32, and further into the hollow interior of the handlebar 25'. More specifically, once in the hollow interior of the handlebar 25' the brake cable 50 is inserted between the support walls 26a and 26b. In this case, since the brake cable 50 is installed between the support walls 26a and 26b through the second slit 32, less of the brake cable 50 is exposed to the outside, affording a simpler and uncluttered look around the brake lever 28. This results in the handlebar 19 being more lightweight, with fewer parts and allows the empty space inside the handlebar main body 25' to be utilized more effectively.

Other Embodiments (a) In the above embodiments, the present invention is described using as an example a handlebar having a handlebar main body that is generally straight along its length (perpendicular to the length of the bicycle 5). However, it should be understood from the drawings and the description herein that the handlebar can have with an upright handlebar main body or a drop-style handlebar main body where the handlebar has arcuate, curved or otherwise contoured shapes.

Figure 4:
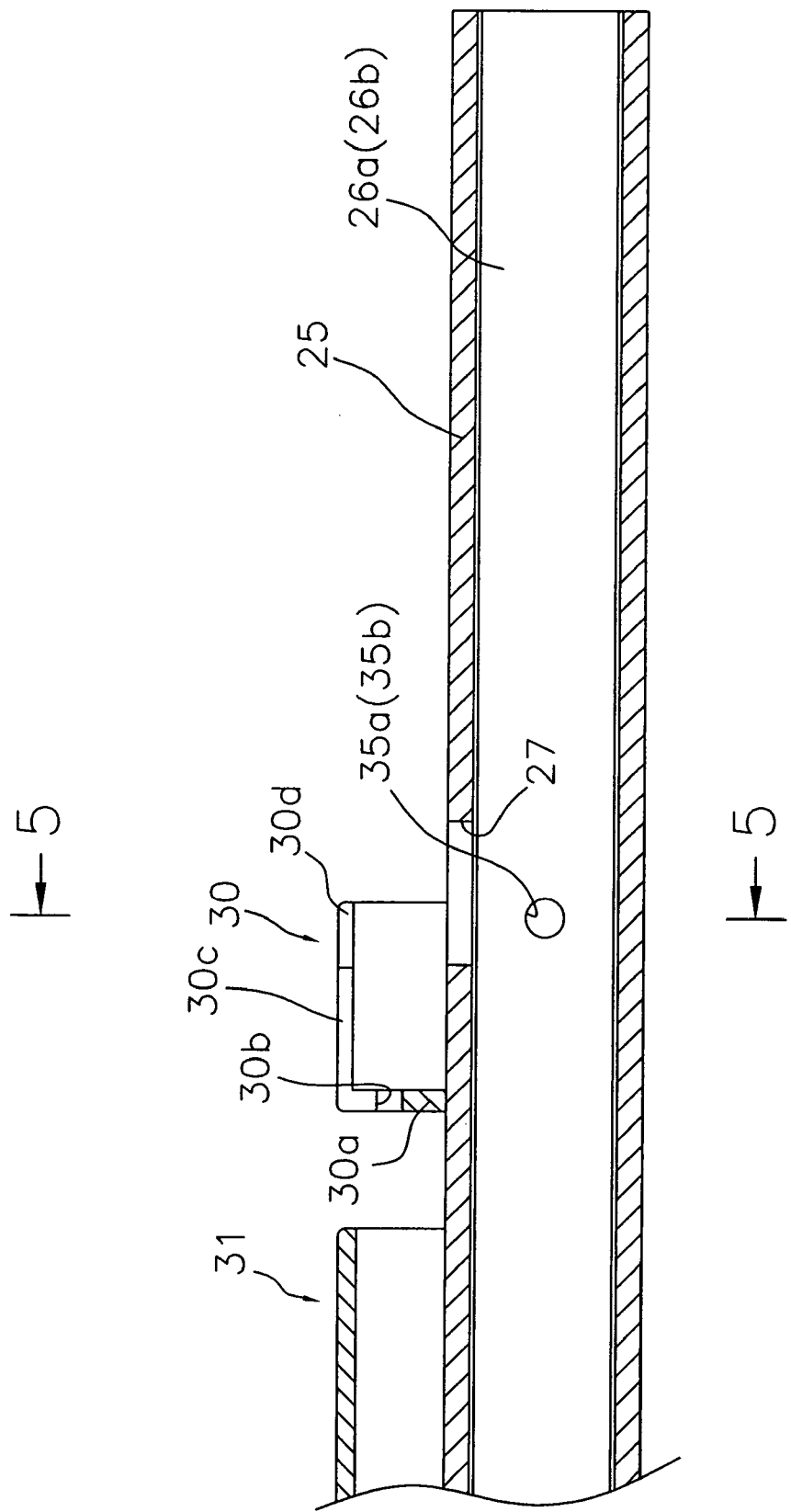
FIG. 4 is a partial cross sectional view of the handlebar similar to FIG. 2, but with elements removed to show details of the handlebar main body in accordance with the first embodiment of the present invention.
Figure 5:
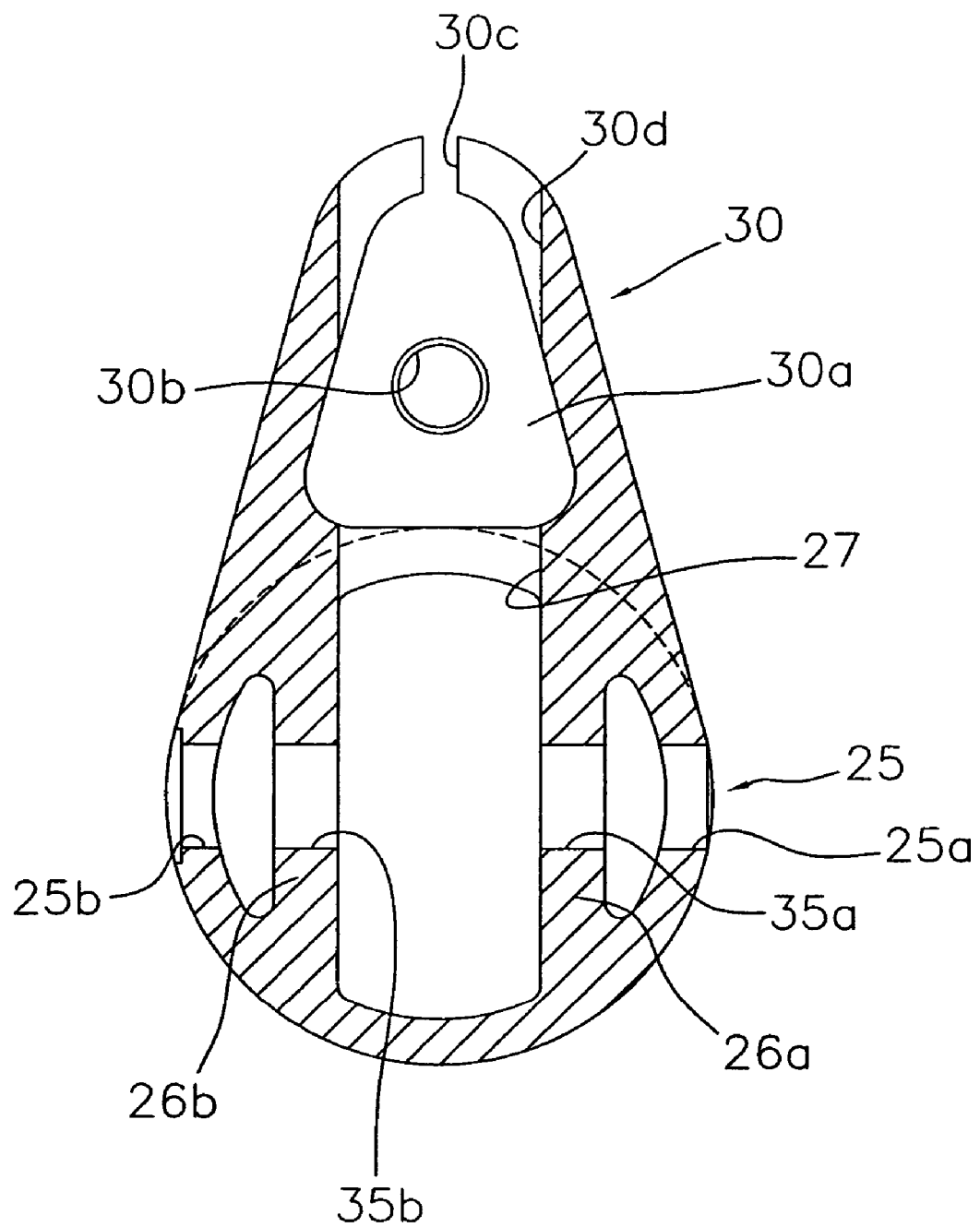
FIG. 5 is a cross sectional view of the handlebar main body taken along the line 5-5 in FIG. 4 in accordance with the first embodiment of the present invention.

(b) In the above embodiments, the handlebar main body 25 includes the brake lever 28 mounted therein. However, as indicated in FIGS. 4 and 5, the handlebar main body 25 of the present invention can alternatively be directed to a handlebar main body that does not include a brake lever. Rather, handlebar main body 25 can be configured as shown, ready to receive a brake lever. In other words, the invention is directed to a unitary handlebar main body that is configured to receive a brake lever and support that brake lever but does not include the brake lever.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle handlebar, comprising:
 a handlebar main body having a pair of right and left side grip support portions, at least one lever support portion, the handlebar main body having a hollow interior, and a central portion of the handlebar main body being configured for mounting on a bicycle handlebar stem;
 a pair of support walls extending in a lengthwise direction throughout the entire length of the hollow interior of the handlebar main body between right and left side grip support portions within the lever support portion of the hollow interior of the handlebar main body, the support walls defining a space therebetween within the hollow interior of the handlebar main body, with the right and left side grip portions, the at least one lever support portion, the central portion and the pair of support walls all being formed as a single one piece unitary element;

a first slit formed in the handlebar main body and extending from the hollow interior to an exterior thereof, the first slit being open to at least a portion of the space between the support walls; and a brake lever including a lever body and a brake cable attachment portion, the lever body having a pivot support portion and a brake operating portion, the pivot support portion extending into the space between the support walls and being pivotally mounted to the support walls proximate the first slit, the brake operating portion extending outward from the pivot support portion through the first slit and away from the handlebar main body, and the brake cable attachment portion located on the lever body between the brake operating portion and the pivot support portion.

2. The bicycle handlebar according to claim 1, wherein a brake cable connected to the brake cable attachment portion is a Bowden type having an inner cable and an outer casing in which the inner cable is movably installed, the brake cable attachment portion has an inner cable connector for attachment to the inner cable, and the bicycle handlebar further includes a cable casing connector provided on the handlebar main body that engages the outer casing of the brake cable.

3. The bicycle handlebar according to claim 2, further comprising:

a cable casing adjustor member disposed proximate the lever support portion;

a second slit that extends between the hollow interior of the handlebar main body to the exterior thereof proximate the cable casing adjustor member, the second slit being open to a portion of the space between the support walls closer to a handlebar stem mounting location than the first slit, the brake cable extending into the second slit and the hollow interior of the handlebar main body.

4. A bicycle handlebar comprising:

a handlebar main body having a pair of right and left side grip support portions, at least one lever support portion, the handlebar main body having a hollow interior, and a central portion of the handlebar main body being configured for mounting on a bicycle handlebar stem;

a pair of support walls extending in a lengthwise direction throughout the entire length of the hollow interior of the handlebar main body between right and left side grip support portions within the lever support portion of the hollow interior of the handlebar main body, the support walls defining a space therebetween within the hollow interior of the handlebar main body, with the right and left side grip portions, the at least one lever support portion, the central portion and the pair of support walls all being formed as a single one piece unitary element;

a first slit formed in the handlebar main body and extending from the hollow interior to an exterior thereof, the first slit being open to at least a portion of the space between the support walls;

a brake lever including a lever body and a brake cable attachment portion, the lever body having a pivot support portion and a brake operating portion, the pivot support portion extending into the space between the support walls and being pivotally mounted to the support walls proximate the first slit, the brake operating portion extending outward from the pivot support portion through the first slit and away from the handlebar main body, and the brake cable attachment portion located on the lever body between the brake operating portion and the pivot support portion;

a brake cable connected to the brake cable attachment portion that is a Bowden type having an inner cable and an outer casing in which the inner cable is movably installed, the brake cable attachment portion has an inner cable connector for attachment to the inner cable, and the bicycle handlebar further includes a cable casing connector provided on the handlebar main body that engages the outer casing of the brake cable; and a brake cable housing formed on an outer periphery of the handlebar main body, the brake cable housing being integrally formed with the handlebar main body and having an open end located proximate the brake cable attachment portion for receiving the brake cable.

5. The bicycle handlebar according to claim 1, wherein the brake operating portion has a first portion on the proximal end side closer to the pivot support portion, and a second portion on the distal end side farther away from the pivot support portion than the first portion, wherein when the brake lever is pivoted toward the handlebar main body, the second portion is positioned closer to the handlebar main body than the first portion.

6. A bicycle handlebar, comprising:

a single member hollow handlebar main body having a pair of right and left side grip support portions, at least one lever support portion and a central portion of the handlebar main body that is arranged and configured for mounting on a handlebar stem of a bicycle;

a pair of support walls extending in a lengthwise direction throughout the entire length of the hollow interior of the handlebar main body between right and left side grip support portions and within the lever support portion of the hollow interior of the handlebar main body, the support walls defining a space therebetween within the hollow interior of the handlebar main body, a portion of the space between the support walls being arranged and configured to receive a brake lever, with the right and left side grip portions, the at least one lever support portion, the central portion, the pair of support walls and the lever shaft support portion all being formed as a single one piece unitary element;

a first slit formed in at least a portion of the handlebar main body, the first slit being open to a first portion of the space between the support walls and an exterior of the handlebar main body, the first slit being arranged and configured to receive a portion of the brake lever; and a lever shaft support portion formed with an insertion hole that is arranged and configured for receiving a lever shaft for pivotally supporting the brake lever.

7. The bicycle handlebar according to claim 6, further comprising a second slit formed in at least a portion of the handlebar main body, the second slit being open to a second portion of the space between the support walls and an exterior of the handlebar main body, the second slit being located between a handlebar stem mounting position and the first slit.

8. The bicycle handlebar according to claim 1, wherein the handlebar main body is made from drawn aluminum alloy.

9. The bicycle handlebar according to claim 6, wherein the handlebar main body is made from drawn aluminum alloy.

10. The bicycle handlebar according to claim 1, wherein the handle bar main body includes a pair of first lever shaft insertion holes, the support walls include a pair of second lever shaft insertion holes aligned with the first lever shaft insertion holes, the pivot support portion of the brake lever includes a pivot support hole, and the bicycle handlebar further comprises a lever shaft extending through the first and second lever shaft insertion holes and the pivot support hole.

11. The bicycle handlebar according to claim 6, wherein the handle bar main body includes a pair of first lever shaft insertion holes, the support walls include a pair of second lever shaft insertion holes aligned with the first lever shaft insertion holes, the brake lever includes a pivot support hole, and the bicycle handlebar further comprises a lever shaft extending through the first and second lever shaft insertion holes and the pivot support hole.

* * * * *